(12) United States Patent
Purcell et al.

(10) Patent No.: US 11,615,906 B2
(45) Date of Patent: Mar. 28, 2023

(54) LOW-PROFILE TRANSFORMER AND RELATED COMPONENTS, SYSTEMS, AND METHODS

(71) Applicant: HITACHI ENERGY SWITZERLAND AG, Baden (CH)

(72) Inventors: Bruce Purcell, Columbia, MO (US); Shane Corlman, Jefferson City, MO (US); Simon Grbec, Jefferson City, MO (US)

(73) Assignee: HITACHI ENERGY SWITZERLAND AG, Baden (CH)

(*) Notice: Subject to any disclaimer, the term of this patent is extended or adjusted under 35 U.S.C. 154(b) by 523 days.

(21) Appl. No.: 16/870,800

(22) Filed: May 8, 2020

(65) Prior Publication Data

US 2021/0350966 A1 Nov. 11, 2021

(51) Int. Cl.
| | | |
|---|---|---|
| H02G 3/08 | (2006.01) | |
| H01F 27/02 | (2006.01) | |
| H01R 13/53 | (2006.01) | |
| H01F 27/12 | (2006.01) | |
| H02G 9/04 | (2006.01) | |
| H01F 27/04 | (2006.01) | |
| H02G 9/02 | (2006.01) | |

(52) U.S. Cl.
CPC .............. *H01F 27/02* (2013.01); *H01F 27/04* (2013.01); *H01F 27/12* (2013.01); *H01R 13/53* (2013.01); *H02G 9/04* (2013.01); *H02G 9/02* (2013.01)

(58) Field of Classification Search
CPC .......... H02G 3/08; H02G 3/081; H02G 3/083; H02G 9/00; H02G 9/02; H02G 9/04; H05K 5/00; H05K 5/02; H05K 5/0217; H05K 5/0247; H05K 5/04; H01R 13/46; H01R 13/53; H01F 27/02; H01F 27/06; H01F 27/12; H01F 27/04; H02B 7/00; H02B 7/08
USPC ...... 174/50, 50.5, 520, 521, 535, 559, 17 R; 220/3.2–3.9, 4.02; 361/600, 601, 602, 361/620, 641, 659, 679.01, 622, 623; 312/351.11, 351.12, 351.13, 223.2
See application file for complete search history.

(56) References Cited

U.S. PATENT DOCUMENTS 3,947,650 A * 3/1976 Strain .................... H01H 33/91
218/71
4,005,253 A * 1/1977 Walter .................... H01F 27/06
70/229

(Continued)

*Primary Examiner* — Angel R Estrada
(74) *Attorney, Agent, or Firm* — Sage Patent Group

(57) ABSTRACT

A transformer includes an outer cabinet and an inner tank. The outer cabinet includes a base configured to be installed below ground level, a housing wall configured to be installed at least partially below ground level, and a sill coupled to the housing wall and configured to be installed above ground level. The sill includes a top access opening between an interior space of the outer cabinet and an exterior of the outer cabinet. The inner tank is disposed on the base at least partially below ground level and includes an active part including a transformer circuit. The inner tank includes a plurality of terminals electrically coupled to the active part, each terminal extending from the inner tank into the interior space of the outer cabinet along a respective terminal axis that passes through the top access opening at a respective upward angle with respect to ground level.

20 Claims, 5 Drawing Sheets

(56) References Cited

U.S. PATENT DOCUMENTS

| | | | | |
|---|---|---|---|---|
| 6,066,802 | A * | 5/2000 | Reinke | H01F 27/02 |
| | | | | 49/142 |
| 7,142,410 | B2 * | 11/2006 | Norris | H01F 27/40 |
| | | | | 361/620 |
| 7,324,332 | B1 * | 1/2008 | Shelton | H02B 1/50 |
| | | | | 361/672 |
| 7,475,515 | B2 * | 1/2009 | Machledt | H02G 9/10 |
| | | | | 220/500 |
| 8,299,880 | B2 * | 10/2012 | Scian | H01F 27/04 |
| | | | | 336/107 |
| 8,581,097 | B2 * | 11/2013 | Ward | H01F 27/02 |
| | | | | 49/501 |
| 8,760,854 | B2 * | 6/2014 | Sterkel | G01D 4/002 |
| | | | | 343/702 |
| 8,854,775 | B2 * | 10/2014 | Head | H01F 27/004 |
| | | | | 361/620 |
| 8,891,228 | B2 * | 11/2014 | Gerovac | H01F 27/06 |
| | | | | 361/620 |

* cited by examiner

500 ⟶

```
┌─────────────────────────────────────────────────────────────────┐
│ DISPOSE HIGH VOLTAGE POWER LINES THROUGH A GROUND OPENING OF AN │
│ OUTER CABINET OF A TRANSFORMER INTO A INTERIOR SPACE OF THE     │
│ OUTER CABINET                                                    │
│ 502                                                              │
└─────────────────────────────────────────────────────────────────┘
                                  ↓
┌─────────────────────────────────────────────────────────────────┐
│ ENGAGE A CONNECTOR INTERFACE OF A HOT STICK TO A HOT STICK      │
│ INTERFACE OF A SEPARABLE INSULATED CONNECTOR OF EACH POWER LINE │
│ 504                                                              │
└─────────────────────────────────────────────────────────────────┘
                                  ↓
┌─────────────────────────────────────────────────────────────────┐
│ POSITION THE HOT STICK THROUGH THE TOP ACCESS OPENING OF THE    │
│ OUTER CABINET TO CONNECT THE CONNECTOR TO A HIGH VOLTAGE        │
│ TERMINAL OF THE INNER TANK                                       │
│ 506                                                              │
└─────────────────────────────────────────────────────────────────┘
                                  ↓
┌─────────────────────────────────────────────────────────────────┐
│ SUPPLY A HIGH VOLTAGE ELECTRICAL CURRENT TO AN ACTIVE PART OF   │
│ THE INNER TANK VIA THE HIGH VOLTAGE TERMINALS                    │
│ 508                                                              │
└─────────────────────────────────────────────────────────────────┘
                                  ↓
┌─────────────────────────────────────────────────────────────────┐
│ TRANSFORM, BY A TRANSFORMER CIRCUIT OF THE ACTIVE PART, THE     │
│ HIGH VOLTAGE ELECTRICAL CURRENT INTO A LOW VOLTAGE ELECTRICAL   │
│ CURRENT                                                          │
│ 510                                                              │
└─────────────────────────────────────────────────────────────────┘
                                  ↓
┌─────────────────────────────────────────────────────────────────┐
│ PROVIDE THE LOW VOLTAGE ELECTRICAL CURRENT TO A LOW VOLTAGE     │
│ TERMINAL OF THE INNER TANK                                       │
│ 512                                                              │
└─────────────────────────────────────────────────────────────────┘
```

FIG. 5

LOW-PROFILE TRANSFORMER AND RELATED COMPONENTS, SYSTEMS, AND METHODS

BACKGROUND

The present disclosure relates to electrical transformers, and particularly to low-profile residential transformers for installation partially below ground level in a residential environment.

Conventional electrical power distribution systems employ transformers at various locations across the electrical grid to transform electrical power between a high voltage state, which facilitates transmission of the electrical power over long distances, and a low voltage state, which facilitates usage of the electrical power by end users, such as residential consumers. Many residential transformers are installed above-ground, for example to reduce installation costs.

One drawback to these above-ground transformers is that many customers find these above-ground installations to be unattractive. However, existing below-ground installations may have other drawbacks, such as increased costs, and increased cooling requirements, for example. Thus, there is a need to reduce the visibility of transformers and other service infrastructure that retains many of the benefits of above-ground installations.

SUMMARY

According to some embodiments, a transformer includes an outer cabinet and an inner tank. The outer cabinet includes a base configured to be installed below ground level. The outer cabinet further includes a housing wall configured to be installed at least partially below ground level. The outer cabinet further includes a sill coupled to the housing wall. The sill is configured to be installed above ground level. The sill includes a top access opening between an interior space of the outer cabinet and an exterior of the outer cabinet. The outer cabinet further includes a movable hood configured to be selectively coupled to the sill to cover the top access opening. The inner tank is configured to be disposed on the base within the interior space of the outer cabinet at least partially below ground level. The inner tank includes an active part disposed within the inner tank, wherein the active part includes a transformer circuit configured to transform a first electrical current having a first voltage to a second electrical current having a second voltage. The inner tank further includes a plurality of terminals electrically coupled to the active part. Each terminal of the plurality of terminals extends from the inner tank into the interior space of the outer cabinet along a respective terminal axis that passes through the top access opening at a respective upward angle with respect to ground level.

According to some embodiments, the inner tank is configured to be installed at least partially above ground level to position the plurality of terminals above ground level.

According to some embodiments, for each terminal of the plurality of terminals, the respective upward angle is greater than 0 degrees with respect to ground level, and less than 90 degrees with respect to ground level.

According to some embodiments, for each terminal of the plurality of terminals, the respective upward angle is greater than 15 degrees with respect to ground level, and less than 45 degrees with respect to ground level.

According to some embodiments, the transformer further includes a plurality of separable insulated connectors removably coupled to the plurality of terminals. Each connector of the plurality of connectors includes a hot stick interface extending in a direction parallel to the respective terminal axis. The hot stick interface is configured to be engaged by a complementary terminal interface of a hot stick extending parallel to the terminal axis through the top access opening.

According to some embodiments, each connector of the plurality of connectors further includes an elbow coupled to a respective power line.

According to some embodiments, for each connector of the plurality of connectors, the elbow extends away from the hot stick interface at substantially 90 degrees to the direction of the hot stick interface.

According to some embodiments, the base and housing wall include concrete, and the sill and the movable hood include stainless steel.

According to some embodiments, the transformer further includes a ground opening configured to receiving a plurality of underground power lines therethrough into the interior space.

According to some embodiments, the movable hood is configured to be fully removable from the sill.

According to some embodiments, the transformer further includes a hinge coupled between the sill and the movable hood, the hinge configured to permit the hood to be rotated between an open position and a closed position.

According to some embodiments, the transformer further includes a latch configured to selectively secure the movable hood in the closed position.

According to some embodiments, the inner tank is configured to be substantially fluid proof.

According to some embodiments, the inner tank is configured to receive a volume of oil therein to cool the active part.

According to some embodiments, an inner tank for a residential transformer system includes an inner tank housing configured to be disposed at least partially below ground level on a base within an interior space of an outer cabinet of the residential transformer system. The inner tank housing is configured to house an active part comprising a transformer circuit. The inner tank further includes a plurality of high voltage terminals configured to be electrically coupled to the active part, wherein each high voltage terminal of the plurality of high voltage terminals extends from the inner tank housing along a respective terminal axis at a respective upward angle with respect to the base.

According to some embodiments, each connector includes a hot stick interface extending in a direction parallel to the respective terminal axis, wherein the hot stick interface is configured to be engaged by a complementary terminal interface of a hot stick extending parallel to the terminal axis through a top access opening of the outer cabinet.

According to some embodiments, for each high voltage terminal of the plurality of high voltage terminals, the respective upward angle is greater than 15 degrees with respect to ground level, and less than 45 degrees with respect to ground level.

According to some embodiments, a method of supplying power to a transformer includes disposing a plurality of high voltage power lines through a ground opening of an outer cabinet of a transformer into an interior space of the outer cabinet. Each high voltage power line of the plurality of high voltage power lines terminates in a separable insulated connector. The transformer includes an inner tank disposed in the interior space at least partially below ground level. The method further includes removably coupling the separable insulated connectors to a plurality of high voltage terminals of the inner tank to supply a high voltage electrical current to an active part within the inner tank. Each high voltage terminal of the plurality of high voltage terminals extends from the inner tank into the interior space of the outer cabinet along a respective terminal axis that passes through a top access opening of the outer cabinet at a respective upward angle with respect to ground level.

According to some embodiments, the method further includes transforming, by a transformer circuit of the active part, the high voltage electrical current into a low voltage electrical current. The method further includes providing the low voltage electrical current to a low voltage terminal of the inner tank.

According to some embodiments, removably coupling the connectors to the plurality of high voltage terminals further includes, for each connector, engaging a connector interface of a hot stick with a hot stick interface of the connector. Removably coupling the connectors further includes, for each connector, positioning the hot stick through the top access opening of the outer cabinet parallel to the respective terminal axis of the respective high voltage terminal to connect the connector to the high voltage terminal.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings:

FIG. 5 is a flowchart diagram illustrating a process of supplying power to the low-profile transformer of FIGS. 1-4B, according to some embodiments.

DETAILED DESCRIPTION

Figure 1:
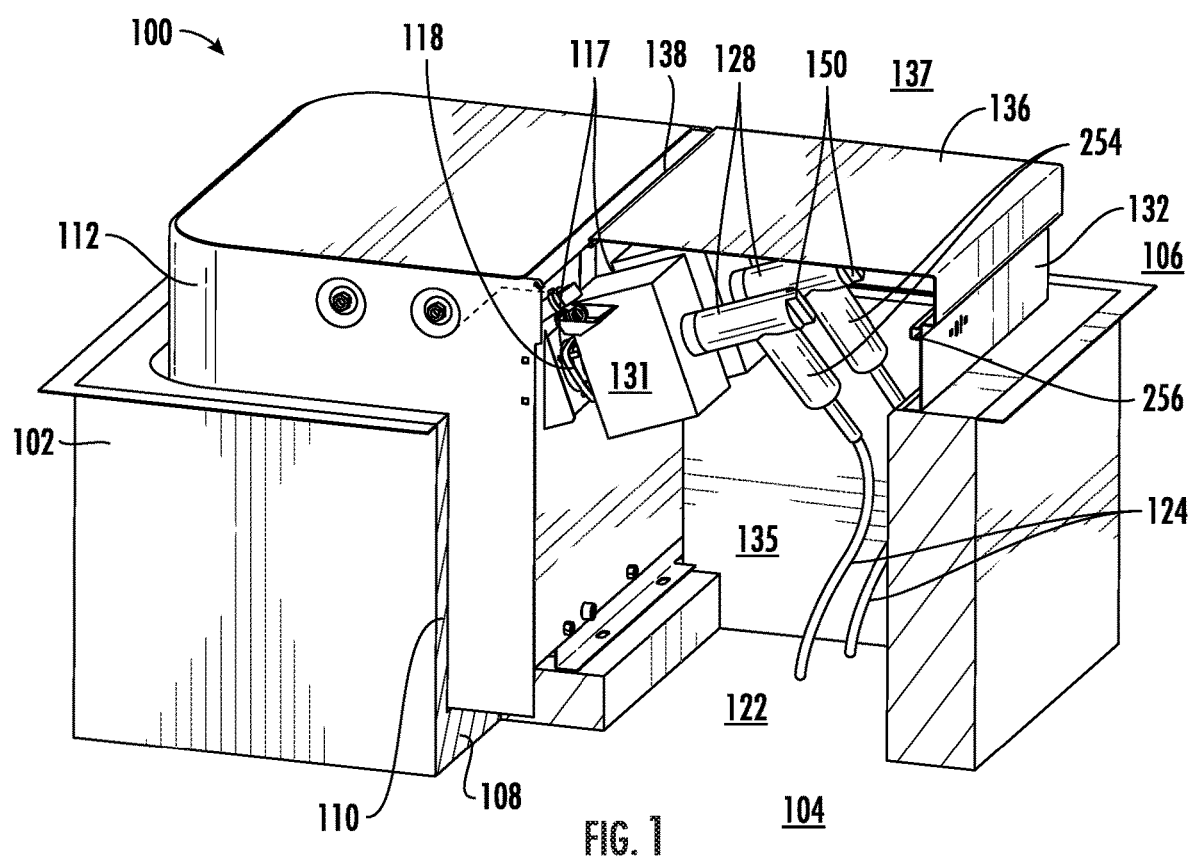
FIG. 1 is a diagram illustrating an installed low-profile transformer according to some embodiments.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

The present disclosure relates to electrical transformers, and particularly to low-profile residential transformers for installation partially below ground level in a residential environment. As discussed above, many end users, such as residential customers for example, find above-ground residential transformers to be unattractive, and seek to minimize visibility of the transformers. One solution is to completely hide the transformer by installing the transformer entirely below-ground, but this solution leads to other problems. For example, the cost of installing the entire transformer below ground may be significantly more than a comparable above-ground installation. In addition, heat transfer between a below-ground transformer and the ground is much lower than heat transfer between an above-ground transformer and the surrounding air. This heating problem may be addressed by increasing the footprint of the below-ground transformer to increase the surface area of the installation that is exposed to the surrounding air, but increasing the footprint may increase costs, may be unacceptable to end users, and may not be feasible in high density areas. Increasing efficiency of the transformer may reduce the total amount of heat generated as well, but this also increases cost and complexity for the transformer, and may not be feasible, especially across an electrical grid that may require hundreds or thousands of individual transformer installations.

Thus, there is a need to reduce the visibility of transformers and other service infrastructure that retains many of the benefits of above-ground installations. Embodiments described herein include transformer installations with significantly reduced height to conventional pad-mounted transformers, while retaining many of the benefits of above-ground installations, such as a reduced footprint and effective cooling. By providing an improved and cost-effective visual profile, end-user satisfaction may be increased in in areas where aesthetics and reduction in visual footprint are highly valued, such as high density and/or residential areas.

In some embodiments, the transformer height may be reduced by more than 50% over conventional above-ground transformer installations, which greatly reduces visibility of the transformer. At the same time, these embodiments include features that permit ease-of-access for technicians that is comparable to that of conventional above-ground installations, and that allow conventional tools to be used.

In some embodiments, a transformer may employ a high efficiency active part in conjunction with a customized foundation that allows a majority of the outer cabinet to be installed below ground-level. In this regard, FIG. 1 is a diagram illustrating an installed low-profile transformer 100 according to some embodiments. The transformer 100 of FIG. 1 includes an outer cabinet 102 disposed below in the ground 104 with a majority of the outer cabinet 102 disposed below ground level 106, i.e., below-grade. The outer cabinet includes a base 108 and a housing wall 110 that encloses an inner tank 112. The base 108 is installed below ground level 106, and the housing wall 110 is installed at least partially below ground level 106. In this example, the base 108 and the housing wall 110 are formed from concrete, which is suitable for below ground installation.

The outer cabinet 102 also includes a sill 132 coupled to the housing wall 110. The sill 132 is installed above ground level 106 and includes a top access opening 134 to provide access between an interior space 135 of the outer cabinet 102 and an exterior 137 (i.e., outside environment) of the outer cabinet 102. In this example, a movable hood 136 may be selectively coupled to the sill 132 to cover the top access opening 134, and at least partially isolate the interior space 135 of the outer cabinet 102 from the exterior 137 of the outer cabinet 102. In this example, the sill 132 and the hood 136 are formed from stainless steel, which is suitable for above ground installation.

The transformer 100 also includes an inner tank 112 disposed on the base 108 within the interior space 135 of the outer cabinet 102 at least partially below ground level 106. An active part 114 is disposed within the inner tank 112 for providing functionality for the transformer 100. For example, the active part 114 may include a transformer circuit 116 configured to transform an electrical current having a one voltage to another electrical current having a different voltage. The inner tank 112 is also configured to receive a volume of oil (not shown) therein, to cool the active part.

The inner tank 112 further includes a plurality of terminals 117 electrically coupled to the active part 114. The terminals 117 may include high voltage terminals 118 and/or low voltage terminals 120, for example, to receive and/or output high voltage and/or low voltage electrical current. In this example, at least a portion of the inner tank is installed above ground level 106, to position the terminals 117 above ground level 106.

Positioning the terminals 117 above ground level 106 has the advantage of reducing the risk of exposing the terminals 117 to water if the interior space 135 becomes flooded. For example, in this example, the outer cabinet 102 includes a ground opening 122 that allow underground cables to be connected to the terminals 117. However, the ground opening 122 also allows ground water to enter and exit the interior space 125, which may result in flooding of the interior space 125 when the ground 104 is saturated, such as during a storm or flood. In this example, the inner tank 112 may be made to be substantially fluid proof, but because it may be more difficult, or impossible, to make the outer cabinet completely fluid proof, positioning the terminals 117 above ground level 106 reduces the risk of water exposure in the event that the interior space 125 becomes flooded.

In this embodiment, each high voltage terminal 118 extends from the inner tank 112 into the interior space 135 of the outer cabinet along a respective terminal axis 140 that passes through the top access opening 134 at a respective upward angle θ (see Figure. with respect to ground level 106 (i.e., 0 degrees). In this example, the respective upward angle of each high voltage terminal 118 is greater than 0 degrees with respect to ground level, and less than 90 degrees with respect to ground level 106. In this specific embodiment, for example, the respective upward angle is greater than 15 degrees with respect to ground level 106, and less than 45 degrees with respect to ground level 106. Positioning the high voltage terminals 118 at the respective upward angles has benefits specific to working with high voltage terminals 118, as will be described in greater detail with respect to FIGS. 2A and 2B. However, it should be understood that the low voltage terminals 120 or other terminals 117 may be similarly upwardly angled. It should be understood that, as used herein, an angle with respect to ground level 106 refers to an angle with respect to a horizontal plane that is perpendicular to the direction of gravity, and that generally corresponds to the surface of the ground 104 around the transformer 100. One of ordinary skill will appreciate that the actual surface around an installed transformer 100 will not be perfectly level or flat, and will also appreciate that an upward angle with respect to ground level corresponds to an angle that includes an upward vertical component with respect to gravity.

Figure 2A:
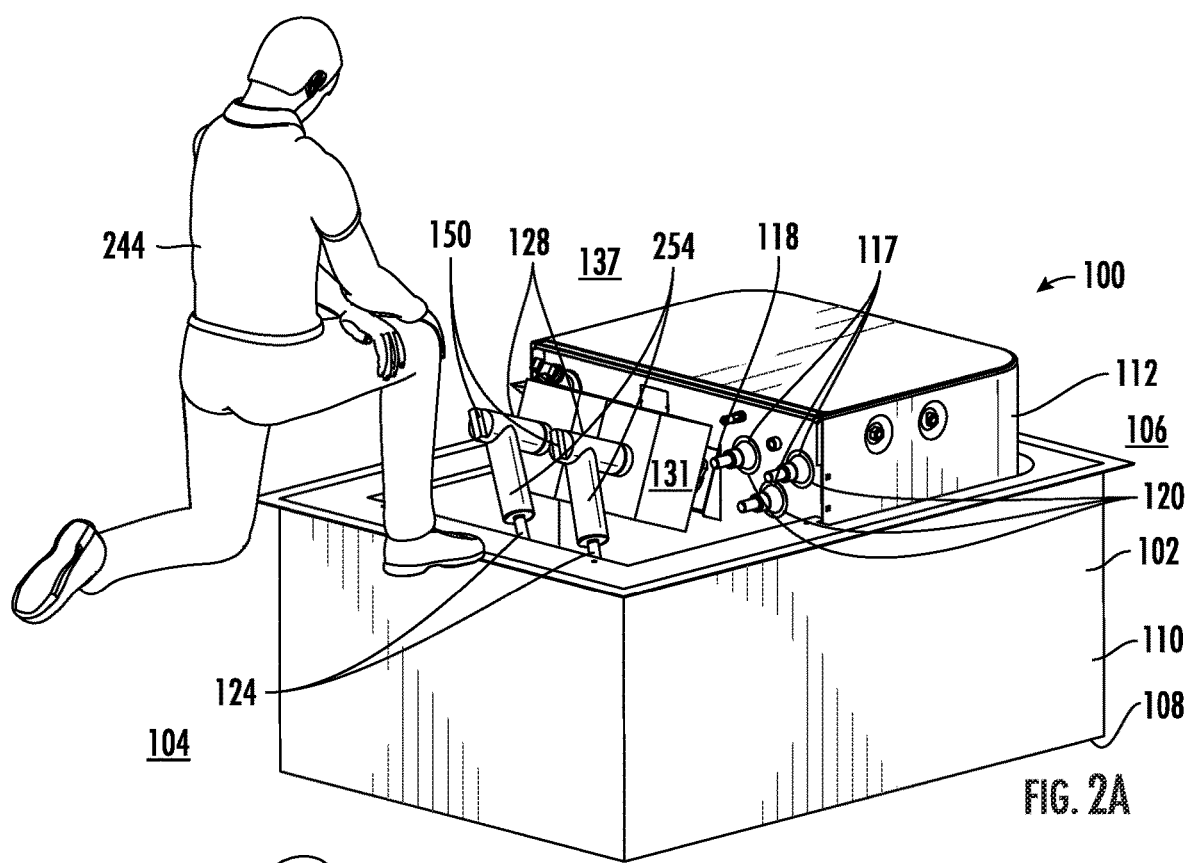
FIGS. 2A and 2B illustrate a technician accessing and servicing the low-profile transformer of FIG. 1, according to some embodiments.
Figure 2B:
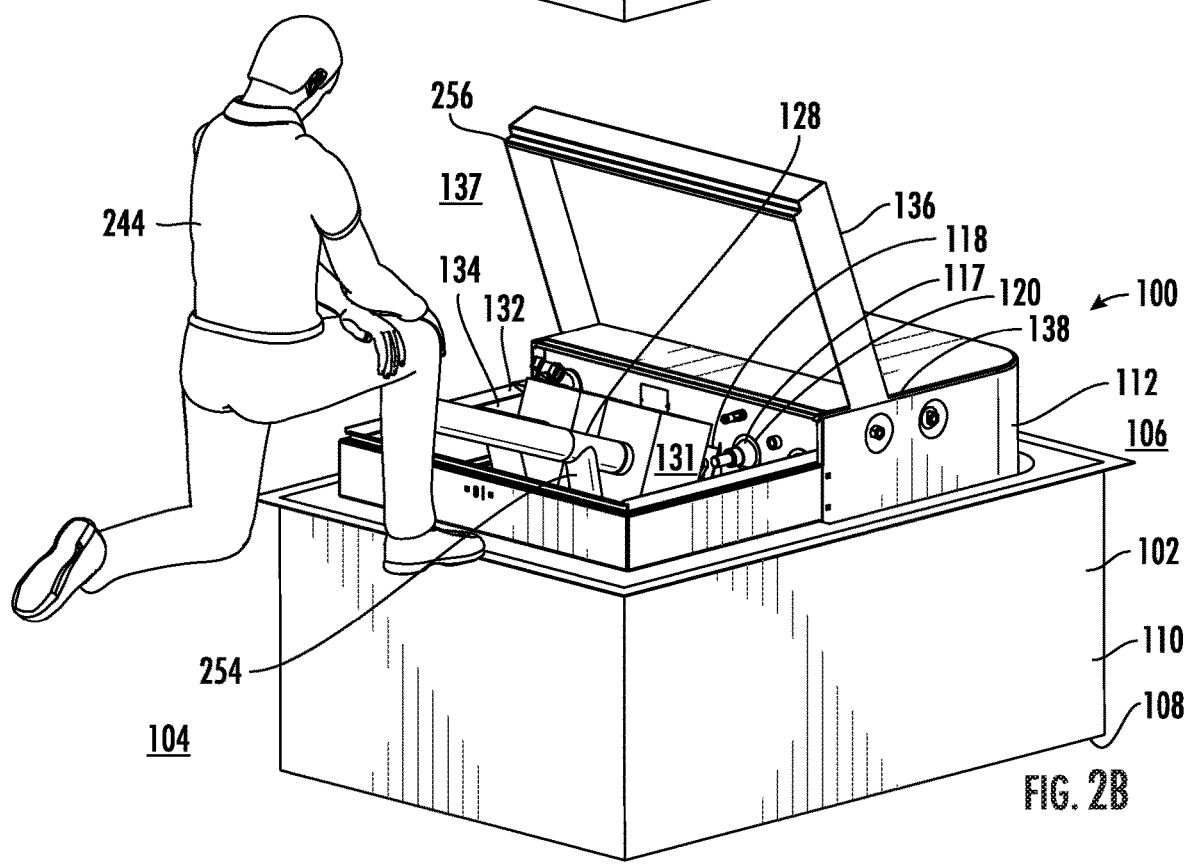

FIGS. 2A and 2B illustrate a technician 244 accessing and servicing the low-profile transformer 100 of FIG. 1, according to some embodiments. As shown by FIG. 2A, the hood 136 is raised to allow access to the terminals 117 through the top access opening 134. In this embodiment, a separable insulated high voltage connector 128 is removably coupled to each of the high voltage terminals 118. In some embodiments, a control device 131 may also be connected between a respective high voltage connector 128 and high voltage terminal 118 to manage power delivery and consumption by the transformer 100.

The upward angle θ of the high voltage terminals 118 causes the high voltage connectors 128 to be oriented so that a respective hot stick interface 150 of each high voltage connector 128 extends along a hot stick axis 252 in a direction parallel to the respective high voltage terminal axis 140. In this specific embodiment, for example, the respective upward angle θ that defines the direction of the terminal axes 140 and hot stick interface axes 252 is greater than 15 degrees with respect to ground level 106, and less than 45 degrees with respect to ground level 106.

In this manner, as shown in FIG. 2B, each hot stick interface 150 is configured to be engaged by a complementary terminal interface 248 of a hot stick 246 extending parallel to the terminal axis 140 through the top access opening 134. Each high voltage connector 128 further includes an elbow 254 connected to a respective high voltage power line 124. In this embodiment, each elbow 254 extends away from the hot stick interface 150 at substantially 90 degrees to the direction of the hot stick interface 150.

The movable hood 136 is configured to be fully removable from the sill 132 (see, e.g., FIG. 2A). As shown by FIG. 2B, the movable hood 136 may also be coupled to the outer cabinet 102 by a hinge 138. The hinge 138 is configured to permit the hood to be rotated between an open position and a closed position. In some alternate embodiments, the hood 136 may be permanently or semi-permanently coupled to the outer cabinet 102. As shown in FIG. 2B, the hood 136 and/or the sill 132 may further include a latch 256 configured to selectively secure the movable hood in the closed position.

Figure 3A:
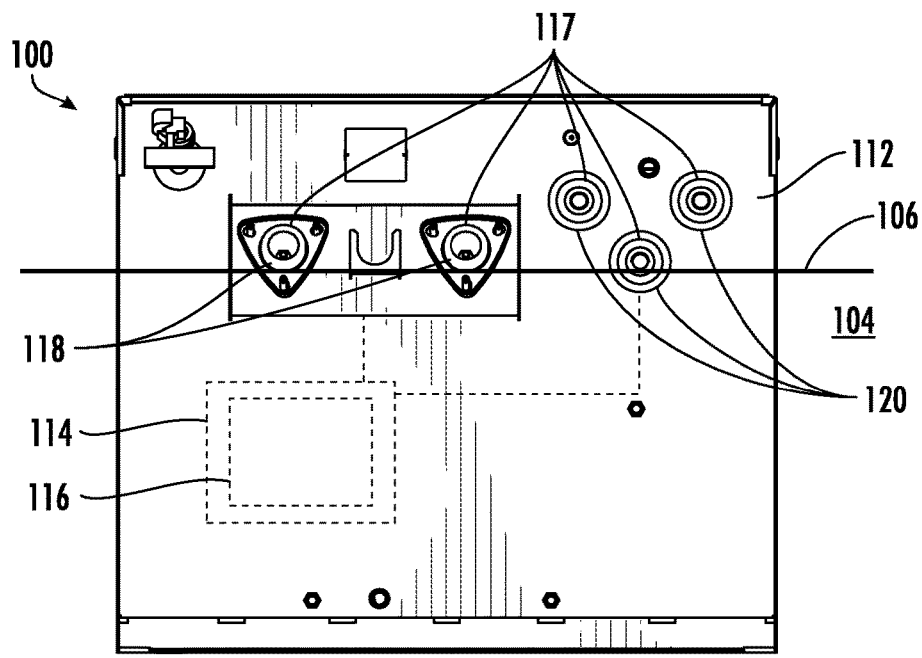
FIGS. 3A and 3B are side views of the low-profile transformer of FIGS. 1-2B illustrating the terminals and other components thereof, according to some embodiments.
Figure 3B:
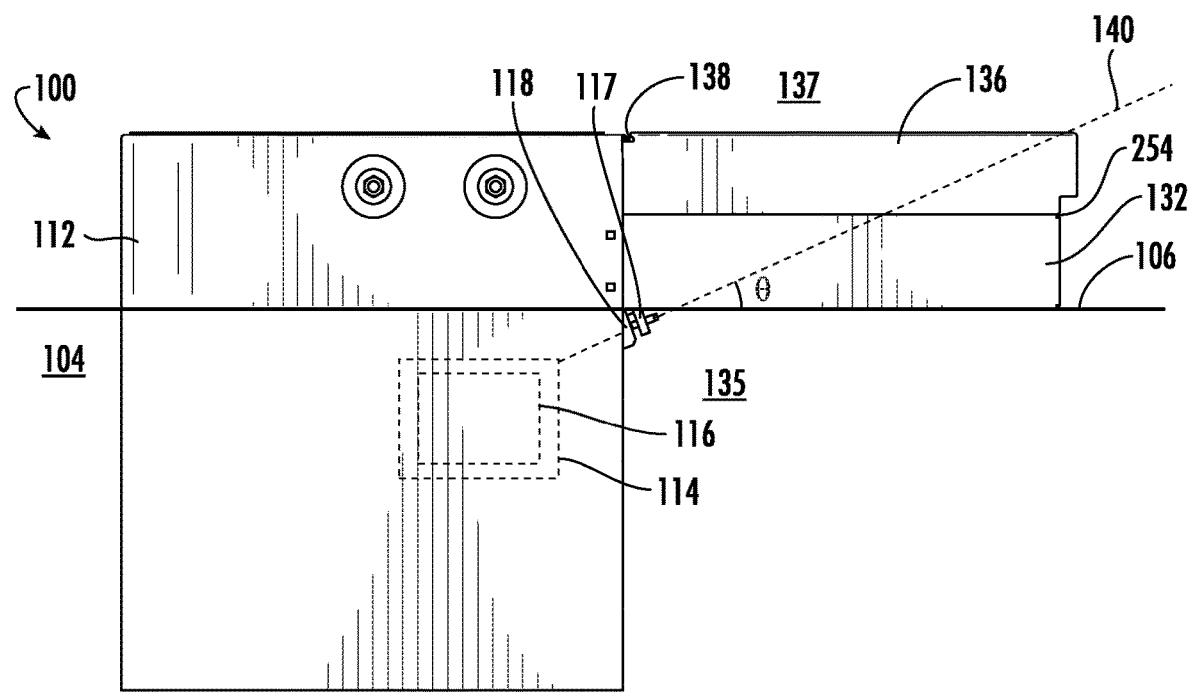

FIGS. 3A and 3B are side views of the low-profile transformer 100 of FIGS. 1-2B, according to some embodiments. As discussed above, the transformer 100 is installed partially below ground level 106, with a portion of the inner tank 112 positioned at or above ground level 106, so that the terminals 117, including the high voltage terminals 118 and low voltage terminals 120 are positioned at or above ground level 106. As discussed above, this arrangement reduces the risk of water damage to the terminals 117 from flooding, for example.

Figure 4A:
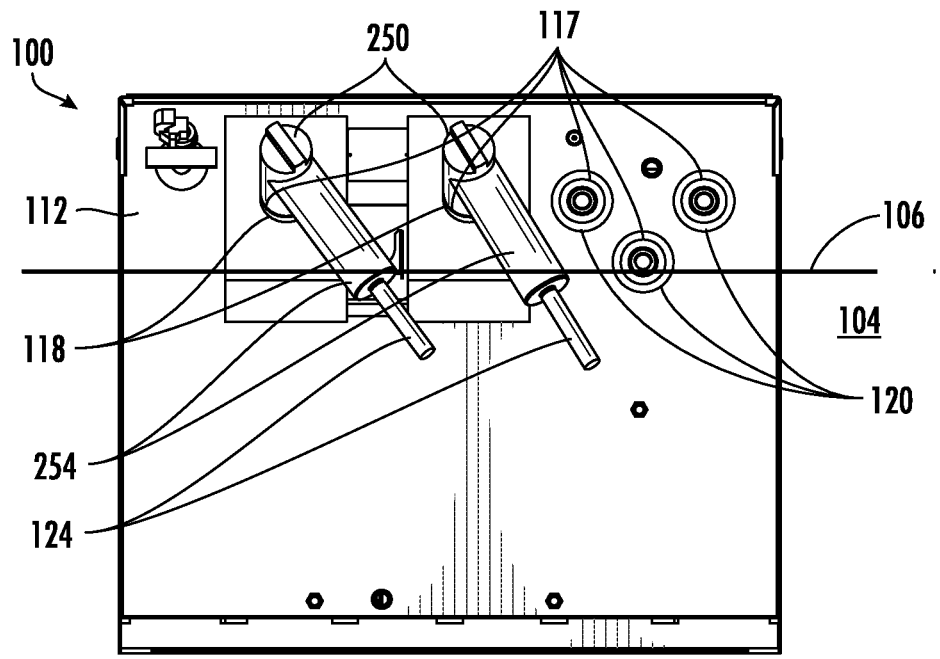
FIGS. 4A and 4B are side views of the low-profile transformer of FIGS. 1-3B, illustrating connections between the terminals of the low-profile transformer and high voltage power lines, according to some embodiments.
Figure 4B:
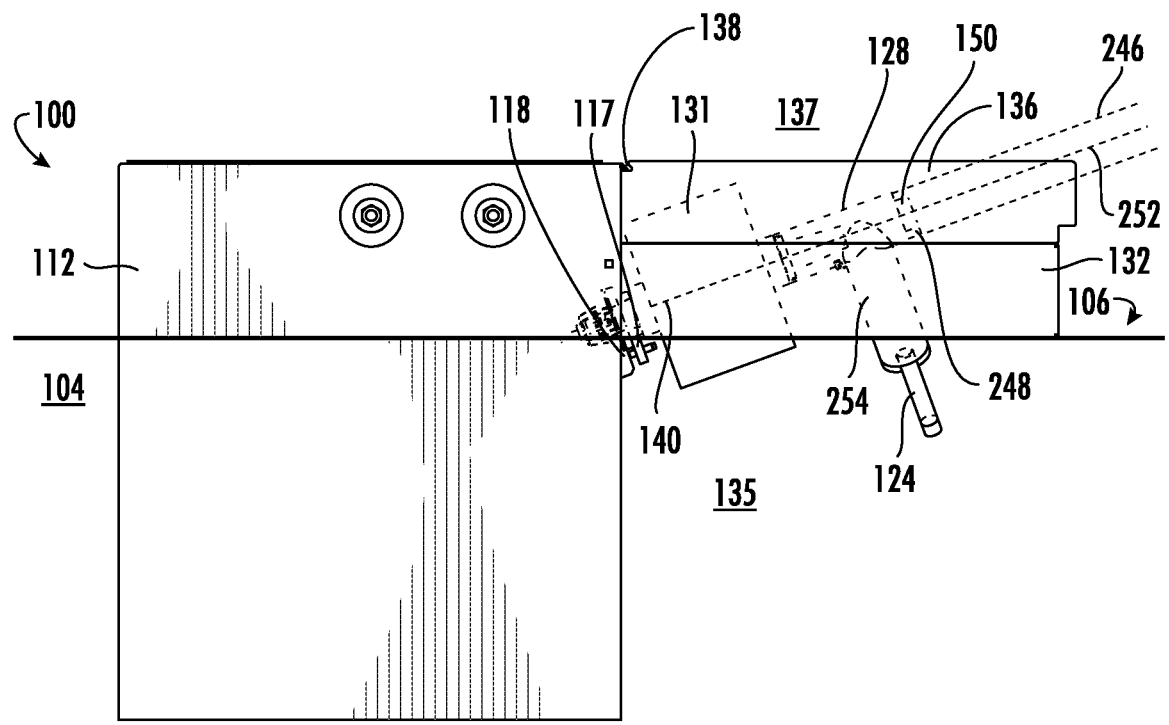

As discussed above, the high voltage terminals 118 extend from the inner tank 112 into the interior space 135 of the outer cabinet along respective terminal axes 140 that pass through the top access opening 134 at an upward angle θ with respect to ground level 106. As shown by FIGS. 4A and 4B, and as discussed above, this arrangement causes the high voltage connectors 128 to be oriented so that a respective hot stick interface 150 of each high voltage connector 128 extends along a hot stick axis 252 in a direction parallel to the respective high voltage terminal axis 140, i.e., at the same upward angle θ. In this regard, FIGS. 4A and 4B are side views of the low-profile transformer 100 of FIGS. 1-3B, illustrating connections between the high voltage terminals 118 of the low-profile transformer 100 and high voltage power lines 124 via the high voltage connectors 128. As discussed above, this arrangement permits each hot stick interface 150 to be engaged by hot stick (not shown) extending parallel to the terminal axis 140 through the top access opening 134.

As a result, these and other embodiments have at least three distinct advantages. First, by partially disposing the transformer below ground level, the overall profile and visibility of the transformer may be reduced without an increase in footprint or the higher costs associated with fully below ground installations. Second, the arrangement of the terminals at or above ground helps protect the terminals and other transformer components from flooding and other environmental hazards. Third, the upward angle of the terminals helps permit a technician to easily and ergonomically access the terminals through the top access opening using conventional tools. It should also be understood that these and other features may be included and/or omitted from some embodiments, as desired.

FIG. 5 is a flowchart diagram illustrating a process of supplying power to the low-profile transformer of FIGS. 1-4B, according to some embodiments. Operations 500 of the process include disposing high voltage power lines through a ground opening of an outer cabinet of a transformer into an interior space of the outer cabinet (Block 502). In this example, each high voltage power line of the plurality of high voltage power lines terminates in a separable insulated connector, and the transformer includes an inner tank disposed in the interior space at least partially below ground level, as discussed above.

The operations 500 may further include engaging a connector interface of a hot stick with a hot stick interface of the connector of each power line. (Block 502). The operations 500 may further include positioning the hot stick through the top access opening of the outer cabinet to connect the connector to a high voltage terminal of the inner tank (Block 504). In this example, each high voltage terminal extends along a terminal axis that passes through a top access opening of the outer cabinet at an upward angle, as discussed above.

The operations 500 further include supplying a high voltage electrical current to an active part within the inner tank via the high voltage terminals (Block 508), and transforming, by a transformer circuit o the active part, the high voltage electrical current into a low voltage electrical current (Block 510). The operations 500 may further include providing the low voltage current to a low voltage terminal of the inner tank (Block 512).

In this manner, these and other embodiments may allow for transformer installations with significantly reduced height, while retaining many of the benefits of above-ground installations, such as a reduced footprint and effective cooling, and without many of the disadvantages of conventional below-ground installations. By providing an improved and cost-effective visual profile, end-user satisfaction may be increased in in areas where aesthetics and reduction in visual footprint are highly valued, such as high density and/or residential areas.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components, or functions but does not preclude the presence or addition of one or more other features, integers, elements, steps, components, functions, or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

What is claimed is:

1. A transformer comprising:
    an outer cabinet including:
        a base configured to be installed below ground level;
        a housing wall configured to be installed at least partially below ground level;
        a sill coupled to the housing wall, the sill configured to be installed above ground level, the sill including a top access opening between an interior space of the outer cabinet and an exterior of the outer cabinet; and
        a movable hood configured to be selectively coupled to the sill to cover the top access opening; and
    an inner tank configured to be disposed on the base within the interior space of the outer cabinet at least partially below ground level, the inner tank including:
        an active part disposed within the inner tank, wherein the active part includes a transformer circuit configured to transform a first electrical current having a first voltage to a second electrical current having a second voltage; and
        a plurality of terminals electrically coupled to the active part,
    wherein each terminal of the plurality of terminals extends from the inner tank into the interior space of the outer cabinet along a respective terminal axis that passes through the top access opening at a respective upward angle with respect to ground level.

2. The transformer of claim 1, wherein the inner tank is configured to be installed at least partially above ground level to position the plurality of terminals above ground level.

3. The transformer of claim 1, wherein, for each terminal of the plurality of terminals, the respective upward angle is greater than 0 degrees with respect to ground level, and less than 90 degrees with respect to ground level.

4. The transformer of claim 3, wherein, for each terminal of the plurality of terminals, the respective upward angle is greater than 15 degrees with respect to ground level, and less than 45 degrees with respect to ground level.

5. The transformer of claim 1, further including a plurality of separable insulated connectors removably coupled to the plurality of terminals,
    wherein each connector of the plurality of connectors includes a hot stick interface extending in a direction parallel to the respective terminal axis, wherein the hot stick interface is configured to be engaged by a complementary terminal interface of a hot stick extending parallel to the terminal axis through the top access opening.

6. The transformer of claim 5, wherein each connector of the plurality of connectors further includes an elbow coupled to a respective power line.

7. The transformer of claim 6, wherein, for each connector of the plurality of connectors, the elbow extends away from the hot stick interface at substantially 90 degrees to the direction of the hot stick interface.

8. The transformer of claim 1, wherein the base and housing wall include concrete, and
    wherein the sill and the movable hood include stainless steel.

9. The transformer of claim 1, further including a ground opening configured to receiving a plurality of underground power lines therethrough into the interior space.

10. The transformer of claim 1, wherein the movable hood is configured to be fully removable from the sill.

11. The transformer of claim 1, further including a hinge coupled between the sill and the movable hood, the hinge configured to permit the hood to be rotated between an open position and a closed position.

12. The transformer of claim 11, further including a latch configured to selectively secure the movable hood in the closed position.

13. The transformer of claim 1, wherein the inner tank is configured to be substantially fluid proof.

14. The transformer of claim 13, wherein the inner tank is configured to receive a volume of oil therein to cool the active part.

15. An inner tank for a residential transformer system, the inner tank comprising:
    an inner tank housing configured to be disposed at least partially below ground level on a base within an interior space of an outer cabinet of the residential transformer system, wherein the inner tank housing is configured to house an active part comprising a transformer circuit; and
    a plurality of high voltage terminals configured to be electrically coupled to the active part, wherein each high voltage terminal of the plurality of high voltage terminals extends from the inner tank housing along a respective terminal axis at a respective upward angle with respect to the base.

16. The inner tank of claim 15, wherein each connector includes a hot stick interface extending in a direction parallel to the respective terminal axis, wherein the hot stick interface is configured to be engaged by a complementary terminal interface of a hot stick extending parallel to the terminal axis through a top access opening of the outer cabinet.

17. The inner tank of claim 15, wherein, for each high voltage terminal of the plurality of high voltage terminals, the respective upward angle is greater than 15 degrees with respect to ground level, and less than 45 degrees with respect to ground level.

18. A method of supplying power to a transformer, the method comprising:
- disposing a plurality of high voltage power lines through a ground opening of an outer cabinet of a transformer into an interior space of the outer cabinet, wherein each high voltage power line of the plurality of high voltage power lines terminates in a separable insulated connector, and wherein the transformer includes an inner tank disposed in the interior space at least partially below ground level; and
- removably coupling the separable insulated connectors to a plurality of high voltage terminals of the inner tank to supply a high voltage electrical current to an active part within the inner tank,
- wherein each high voltage terminal of the plurality of high voltage terminals extends from the inner tank into the interior space of the outer cabinet along a respective terminal axis that passes through a top access opening of the outer cabinet at a respective upward angle with respect to ground level.

19. The method of claim 18 further comprising:
- transforming, by a transformer circuit of the active part, the high voltage electrical current into a low voltage electrical current; and
- providing the low voltage electrical current to a low voltage terminal of the inner tank.

20. The method of claim 18, wherein removably coupling the connectors to the plurality of high voltage terminals further includes, for each connector:
- engaging a connector interface of a hot stick with a hot stick interface of the connector; and
- positioning the hot stick through the top access opening of the outer cabinet parallel to the respective terminal axis of the respective high voltage terminal to connect the connector to the high voltage terminal.

\* \* \* \* \*